United States Patent
Xin et al.

(10) Patent No.: US 10,574,414 B2
(45) Date of Patent: Feb. 25, 2020

(54) PILOT SIGNAL TRANSMISSION METHOD AND APPARATUS, AND TRANSMITTING TERMINAL

(71) Applicant: ZTE CORPORATION, Guangdong (CN)

(72) Inventors: Yu Xin, Guangdong (CN); Guanghui Yu, Guangdong (CN); Aijun Cao, Guangdong (CN); Sohail Taheri, Guangdong (CN); Mir Ghoraishi, Guangdong (CN); Pei Xiao, Guangdong (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 16 days.

(21) Appl. No.: 15/770,480

(22) PCT Filed: Sep. 13, 2016

(86) PCT No.: PCT/CN2016/098887
§ 371 (c)(1),
(2) Date: Apr. 23, 2018

(87) PCT Pub. No.: WO2017/067349
PCT Pub. Date: Apr. 27, 2017

(65) Prior Publication Data
US 2019/0028251 A1    Jan. 24, 2019

(30) Foreign Application Priority Data
Oct. 23, 2015    (CN) .......................... 2015 1 0698036

(51) Int. Cl.
*H04L 27/26* (2006.01)
*H04L 5/00* (2006.01)

(52) U.S. Cl.
CPC .......... *H04L 5/0048* (2013.01); *H04L 5/0098* (2013.01); *H04L 27/264* (2013.01); *H04L 27/2613* (2013.01); *H04L 27/2698* (2013.01)

(58) Field of Classification Search
CPC . H04L 27/2613; H04L 27/264; H04L 5/0048; H04L 5/0098
See application file for complete search history.

(56) References Cited

U.S. PATENT DOCUMENTS

2005/0201268 A1    9/2005    Aoki et al.
2009/0074086 A1*   3/2009    Murakami .......... H04L 27/2613
                                              375/260
(Continued)

FOREIGN PATENT DOCUMENTS

CN    1832466 A      9/2006
CN    101297512 A   10/2008
(Continued)

OTHER PUBLICATIONS

International Search Report dated Oct. 27, 2016 for International Application No. PCT/CN2016/098887, 5 pages.
(Continued)

*Primary Examiner* — Wei Zhao
(74) *Attorney, Agent, or Firm* — Knobbe Martens Olson & Bear LLP

(57) ABSTRACT

Provided are a pilot signal transmission method and apparatus, and a transmitting terminal. The method includes: setting a first pilot signal, a second pilot signal, and a third pilot signal on a same subcarrier; and transmitting the first pilot signal, the second pilot signal, and the third pilot signal respectively on three continuous symbols on the same subcarrier. The first pilot signal, the second pilot signal, and the third pilot signal are all nonzero data, a phase difference between the first pilot signal and the second pilot signal is 90 degrees, a phase difference between the third pilot signal and (Continued)

the second pilot signal is 90 degrees, and a phase difference between the first pilot signal and the third pilot signal is 180 degrees.

19 Claims, 4 Drawing Sheets

(56) References Cited

U.S. PATENT DOCUMENTS

| | | |
|---|---|---|
| 2009/0225885 A1 | 9/2009 | Aoki et al. |
| 2009/0238290 A1 | 9/2009 | Imai et al. |
| 2010/0008443 A1 | 1/2010 | Casamajou |
| 2010/0040167 A1 | 2/2010 | Aoki et al. |
| 2012/0063540 A1 | 3/2012 | Aoki et al. |
| 2013/0156127 A1* | 6/2013 | Schilling ............... H04L 25/02 375/295 |
| 2014/0376672 A1 | 12/2014 | Aoki |
| 2015/0163029 A1* | 6/2015 | Murakami ........... H04B 7/0689 370/476 |
| 2016/0164707 A1 | 6/2016 | Aoki et al. |

FOREIGN PATENT DOCUMENTS

| | | |
|---|---|---|
| CN | 104506467 A | 4/2015 |
| EP | 2445156 A2 | 4/2012 |
| WO | 2008/007019 A2 | 1/2008 |
| WO | 2008093253 A1 | 8/2008 |
| WO | 2011050643 A1 | 5/2011 |

OTHER PUBLICATIONS

Written Opinion of the International Searching Authority dated Oct. 27, 2016 for International Application No. PCT/CN2016/098887, 3 pages.

Extended European Search Report of corresponding Patent Application No. 16856782.4—10 pages (dated Jun. 26, 2019).

Kofidis et al., "Improved Interference Approximation Method for Preamble-Based Channel Estimation in FBMC/OQAM", 19th European Signal Processing Conference—5 pages (Aug. 29, 2011).

Taheri et al., "Overhead Reduced Preamble-Based Channel Estimation for MIMO-FBMC Systems", 2015 International Wireless Communications and Mobile Computing Conference (IWCMC)—5 pages (Aug. 24, 2015).

* cited by examiner

PILOT SIGNAL TRANSMISSION METHOD AND APPARATUS, AND TRANSMITTING TERMINAL

CROSS REFERENCE TO RELATED APPLICATIONS

This is the U.S. National Stage Application filed under 35 U.S.C. § 371 of International Patent Application No. PCT/CN2016/098887, filed on Sep. 13, 2016, which claims priority to Chinese patent application No. 201510698036.6 filed on Oct. 23, 2015, the entire disclosure of each of which are hereby incorporated by reference.

TECHNICAL FIELD

The present disclosure relates to, but is not limited to, the field of data communications, and more particularly to a pilot signal transmission method and apparatus, and a transmitting terminal.

BACKGROUND

Long term evolution (LTE) technology is the 4G (fourth Generation) of wireless cellular communication technology. The LTE technology adopts orthogonal frequency division multiplexing (OFDM) technology, in which time-frequency resources constituted by subcarriers and OFDM symbols make up radio physical resources of a LTE system. At present, the OFDM technology has been widely applied in wireless communications. A CP-OFDM system adopting a cyclic prefix (CP) can shorten the multipath delay well, and divides a frequency selective channel into a set of parallel flat channels, which simplifies the channel estimation method well, and achieves a high accuracy in channel estimation. However, the performance of the CP-OFDM system is sensitive to frequency shifts, that is, Doppler shifts, which is mainly due to the large spectrum leakage of the system. This can easily cause inter-carrier interference (ICI). Moreover, the CP also occupies time resources and reduces the spectral efficiency.

Nowadays, companies begin to study the 5G (Fifth Generation) of wireless communication technology, in which filter bank-based multicarrier offset quadrature amplitude modulation (FBMC-OQAM) technology may be adopted. In the case where the subcarriers are distributed at equal intervals, the length of a symbol in the FBMC-OQAM is half the length of a symbol in OFDM. The FBMC-OQAM is also called OFDM-OQAM in some documents. The FBMC-OQAM uses a proper pulse shaping function to filter, reducing out-of-band leakage and better countering effects of frequency shifts and Doppler shifts. Moreover, the FBMC-OQAM does not require the use of the CP, which also helps to increase the spectral efficiency.

However, for an actual faded channel, inherent interferences exist between the subcarriers and between the symbols of the FBMC-OQAM system. In particular, there are large interferences between adjacent subcarriers and between adjacent symbols, which will seriously affect thee channel estimation performance of a receiving terminal and further affect the demodulation of data. An original channel estimation method of the CP-OFDM system may not be directly used in the FBMC-OQAM system. Accordingly, a pilot frequency of the FBMC-OQAM system needs to be specially designed and a different channel estimation method should be adopted accordingly.

There are several channel estimation methods of the FBMC-OQAM system in the related art. One method is to use null data symbols to separate pilot symbols from data symbols, so as to reduce the interference of the data symbols on the pilot symbols, and further improve the channel estimation performance. However, in such a setting method, the pilot signal overhead is high. Furthermore, in the case of multiple antennas, multiple null data symbols are needed to separate the pilot symbols of each antenna, which further makes the pilot signal overhead high. Moreover, the channel estimation performance is poor in this method. Another method is to use an auxiliary pilot to cancel the interference of surrounding data on pilot data. If the number of auxiliary pilots is small, the power of the auxiliary pilots will be large in order to cancel out the interference. However, large power of the auxiliary pilots will affect the peak-to-average ratio of the signal. On the contrary, if the number of auxiliary pilots is large, it will lead to a high pilot overhead, and the channel estimation performance is poor in such a setting method. Accordingly, it is eager to providing a good pilot signal design method and a corresponding channel estimation method in the FBMC-OQAM system.

In other filter bank-based multicarrier (FBMC) systems, such as a Generalized Frequency Division Multiplexing (GFDM) system, it is also necessary to provide a good pilot signal design method and the corresponding channel estimation method. Accordingly, it is required to propose a good pilot signal design method commonly used for as many systems based on time-frequency physical resources as possible.

SUMMARY

Below is an overview of the subject matter detailed herein. This summary is not intended to limit a protection scope of the claims.

Embodiments of the present disclosure provide a pilot signal transmission method and apparatus, and a transmitting terminal, which reduce pilot overhead and improve channel estimation performance.

An embodiment of the present disclosure proposes a pilot signal transmission method, including:

setting a first pilot signal, a second pilot signal, and a third pilot signal on a same subcarrier; and transmitting the first pilot signal, the second pilot signal, and the third pilot signal respectively on three consecutive symbols on the same subcarrier;

the first pilot signal, the second pilot signal, and the third pilot signal are all nonzero data;

a phase difference between the first pilot signal and the second pilot signal is 90 degrees;

a phase difference between the third pilot signal and the second pilot signal is 90 degrees; and a phase difference between the first pilot signal and the third pilot signal is 180 degrees.

In an embodiment, the first pilot signal, the second pilot signal, and the third pilot signal have the same amplitude.

In an embodiment, the first pilot signal, the second pilot signal, and the third pilot signal are respectively $-j*X(m)$, $X(m)$, and $j*X(m)$; or, the first pilot signal, the second pilot signal, and the third pilot signal are respectively $j*X(m)$, $X(m)$, and $-j*X(m)$;

where $X(m)$ is real pilot data, or complex pilot data, or imaginary pilot data.

In an embodiment, pilot signals are transmitted on consecutive subcarriers in frequency domain; or the pilot signals are transmitted on subcarriers distributed at equal frequency intervals in frequency domain.

In an embodiment, the method further includes:

setting pilot signals transmitted on subcarriers corresponding to each of antennas disposed in a transmitting terminal;

where the number of the antennas disposed in the transmitting terminal is P*Q;

the antennas of the transmitting terminal are divided into Q groups, the Q groups each includes P antennas, where P and Q are positive integers, the antennas of a same group each occupies same symbols to transmit the pilot signals;

any two antennas in different groups occupy partially or completely different symbols on time domain to transmit the pilot signals.

In an embodiment, the method further includes:

transmitting, by any two of the P antennas of the same group, the pilot signals on different subcarriers in frequency domain.

In an embodiment, the pilot signals are set on the jth subcarrier corresponding to the ith antenna of the P antennas of the same group;

where i is an integer greater than 0 and less than or equal to P;

where j=a1*k+b1[i]; where a1 is a positive integer greater than or equal to P, b1[i] is a non-negative integer less than a1 and corresponding to the ith antenna, and values of b1[i] corresponding to different antennas are different; and k is a non-negative integer and forms an arithmetic progression.

In an embodiment, in the P antennas of the same group, when the pilot signals are transmitted on the subcarriers of P antennas continuously distributed at intervals in frequency domain and when the ith antenna transmits the pilot signals on a subcarrier m1, on three symbols the same as three symbols for transmitting the pilot signals, signal data transmitted on the subcarrier m1−1 of the ith antenna are set to 0, I(m1−1), 0; signal data transmitted on the subcarrier m1+1 of the ith antenna are set to 0, I(m1+1), 0; where the I(m1+1) is calculated according to a formula containing X(m1); and/or the I(m1−1) is calculated according to a formula containing X(m1).

In an embodiment, the formula containing X(m1) used for calculating the I(m1+1) is:

$$I(m1+1)=X(m1)\langle g\rangle_{m1}^{m1+1}, \text{ or}$$

$$I(m1+1)=X(m1)\langle g\rangle_{m1}^{m1+1}+X(m1+2)\langle g\rangle_{m1+2}^{m1+1};$$

where $$\langle g\rangle_{m1}^{m1+1}=\int g_{m1}(t)g^*_{m1+1}(t)dt, \text{ and}$$

$$\langle g\rangle_{m1+2}^{m1+1}=\int g_{m1+2}(t)g^*_{m1+1}(t)dt,$$

where "*" is a conjugate operation, $g_{m1}$ is a filter function for the second symbol of the three pilot symbols on the subcarrier m1; $g_{m1+1}$ is a filter function for the second symbol of the three pilot symbols on the subcarrier m1+1; $g_{m1-2}$ is a filter function for the second symbol of the three pilot symbols on the subcarrier m1+2;

the formula containing X(m1) used for calculating the I(m1−1) is:

$$I(m1-1)=-X(m1)\langle g\rangle_{m1}^{m1-1}, \text{ or}$$

$$I(m1-1)=-X(m1)\langle g\rangle_{m1}^{m1-1}-X(m1+2)\langle g\rangle_{m1+2}^{m1-1},$$

where "*" is a conjugate operation, $g_{m1}$ is a prototype filter function for the second symbol of the three pilot symbols on the subcarrier m1; $g_{m1-1}$ is a prototype filter function for the second symbol of the three pilot symbols on the subcarrier m1−1; and $g_{m1+2}$ is a prototype filter function for the second symbol of the three pilot symbols on the subcarrier m1+2.

An embodiment of the present disclosure further proposes a pilot signal transmission apparatus, including:

a data unit, which is configured to set a first pilot signal, a second pilot signal, and a third pilot signal on a same subcarrier; and a transmission unit, which is configured to transmit the first pilot signal, the second pilot signal, and the third pilot signal respectively on three consecutive symbols on the same subcarrier;

where the first pilot signal, the second pilot signal, and the third pilot signal are all nonzero data;

a phase difference between the first pilot signal and the second pilot signal is 90 degrees;

a phase difference between the third pilot signal and the second pilot signal is 90 degrees; and a phase difference between the first pilot signal and the third pilot signal is 180 degrees.

In an embodiment, the first pilot signal, the second pilot signal, and the third pilot signal have the same amplitude.

In an embodiment, the first pilot signal, the second pilot signal, and the third pilot signal set by the data unit are respectively −j*X(m), X(m), and j*X(m); or the first pilot signal, the second pilot signal, and the third pilot signal set by the data unit are respectively j*X(m), X(m), and −j*X(m);

where X(m) is real pilot data, or complex pilot data, or imaginary pilot data.

In an embodiment, the transmission unit is configured to transmit pilot signals on consecutive subcarriers in frequency domain; or transmit the pilot signals on subcarriers distributed at equal frequency intervals in frequency domain.

In an embodiment, the data unit is further configured to:

set pilot signals transmitted on subcarriers corresponding to each of antennas disposed in a transmitting terminal;

where the number of the antennas disposed in the transmitting terminal is P*Q;

the antennas of the transmitting terminal are divided into Q groups, the Q groups each includes P antennas, where P and Q are positive integers, the antennas of a same group each is set to occupy same symbols to transmit the pilot signals;

any two antennas in different groups are set to occupy partially or completely different symbols on time domain to transmit the pilot signals.

In an embodiment, the data unit is further configured to:

separately transmit the pilot signals on different subcarriers in frequency domain through any two of the P antennas of the same group.

In an embodiment, the data unit is configured to transmit the pilot signals on the subcarrier through each of the P antennas of the same group in the following manner:

setting the pilot signals on the jth subcarrier corresponding to the ith antenna of the P antennas of the same group;

where i is an integer greater than 0 and less than or equal to P;

where j=a1*k+b1[i]; where a1 is a positive integer greater than or equal to P, b1[i] is a non-negative integer less than a1 and corresponding to the ith antenna, and values of b1[i] corresponding to different antennas are different; k is a non-negative integer and forms an arithmetic progression.

In an embodiment, the data unit is further configured to:

in the P antennas of the same group, when the pilot signals are transmitted on the subcarriers of the P antennas continuously distributed at intervals in frequency domain and when the ith antenna transmits the pilot signals on a subcarrier m1, on three symbols the same as three symbols for transmitting the pilot signals, set signal data transmitted on the subcarrier m1−1 on the ith antenna to 0, I(m1−1), 0; set signal data transmitted on the subcarrier m1+1 on the ith antenna to 0, I(m1+1), 0; where the I(m1+1) is calculated according to a formula containing X(m1); and/or the I(m1−1) is calculated according to a formula containing X(m1).

In an embodiment, the formula containing X(m1) used for calculating I(m1+1) is:

$$I(m1+1) = X(m1) \langle g \rangle_{m1}^{m1+1}, \text{ or}$$

$$I(m1+1) = X(m1) \langle g \rangle_{m1}^{m1+1} + X(m1+2) \langle g \rangle_{m1+2}^{m1+1};$$

where $\langle g \rangle_{m1}^{m1+1} = \int g_{m1}(t) g^*_{m1+1}(t) dt$, and $\langle g \rangle_{m1+2}^{m1+1} = \int g_{m1+2}(t) g^*_{m1+1}(t) dt$, where "*" is a conjugate operation, $g_{m1}$ is a filter function for the second symbol of the three pilot symbols on the subcarrier m1; $g_{m1+1}$ is a filter function for the second symbol of the three pilot symbols on the subcarrier m1+1; $g_{m1+2}$ is a filter function for the second symbol of the three pilot symbols on the subcarrier m1+2;

the formula containing X(m1) used for calculating the I(m1−1) is:

$$I(m1-1) = -X(m1) \langle g \rangle_{m1}^{m1-1}, \text{ or}$$

$$I(m1-1) = -X(m1) \langle g \rangle_{m1}^{m1-1} - X(m1+2) \langle g \rangle_{m1+2}^{m1-1},$$

where "*" is a conjugate operation, $g_{m1}$ is a prototype filter function for the second symbol of the three pilot symbols on the subcarrier m1; $g_{m1-1}$ is a prototype filter function for the second symbol of the three pilot symbols on the subcarrier m1−1; and $g_{m1+2}$ is a prototype filter function for the second symbol of the three pilot symbols on the subcarrier m1+2.

An embodiment of the present disclosure further provides a transmitting terminal, including any of the above pilot signal transmission apparatus.

Compared with the related art, the method provided by the embodiments of the present disclosure includes: setting a first pilot signal, a second pilot signal, and a third pilot signal on a same subcarrier; transmitting the first pilot signal, the second pilot signal, and the third pilot signal respectively on three consecutive symbols on the same subcarrier; the first pilot signal, the second pilot signal, and the third pilot signal are all nonzero data; a phase difference between the first pilot signal and the second pilot signal is 90 degrees; a phase difference between the third pilot signal and the second pilot signal is 90 degrees; and a phase difference between the first pilot signal and the third pilot signal is 180 degrees. By means of the above method, the pilot signals are transmitted by adopting three consecutive symbols on the same subcarrier, and the interference of data on the symbols preceding the first symbol and the symbols subsequent to the third symbol on the pilot signal on the second symbol can be isolated. A phase difference between the pilot data element transmitted on the first symbol and the pilot data element transmitted on the second symbol is 90 degrees, and the phase difference of 90 degrees can increase the signal-to-noise ratio of joint demodulation of the pilot signals in the same direction. A phase difference between the pilot data element transmitted on the third symbol and the pilot data element transmitted on the second symbol is 90 degrees, and similarly, the phase difference of 90 degrees can increase the signal-to-noise ratio of joint demodulation of the pilot signals in the same direction. A phase difference between the pilot data element transmitted on the first symbol and the pilot data element transmitted on the third symbol is 180 degrees, and the phase difference of 180 degrees has the following advantages: the pilot signals at two sides can not only increase the signal-to-noise ratio of joint detection of pilot point signals of an intermediate symbol on the same subcarrier in the same direction, but also has the interferences of the pilot signals at two sides on the pilot signals of the intermediate symbol on the adjacent subcarrier be mutually cancelled out. The embodiments of the present disclosure can save resources for interference separation, thereby reducing the pilot overhead. Moreover, the cancellation of interference can improve the channel estimation performance of a receiving terminal. Accordingly, the present disclosure makes it possible to improve the channel estimation performance of the FBMC system or other systems using time frequency resources as physical resources while keeping the pilot overhead low.

Other aspects will be understood upon reading and understanding accompanying drawings and the detailed description.

DETAILED DESCRIPTION

For ease of understanding by those skilled in the art, embodiments of the present disclosure will be further described below with reference to accompanying drawings. The description below is not intended to limit the protection scope of the present disclosure. It should be noted that the embodiments in the present application and the implementations thereof may be combined without conflict. A pilot signal transmission method proposed in the embodiment of the present disclosure may be used in a FBMC system, and may also be used in other systems, for example, a GFDM system.

Transmitting devices on a transmitting terminal include base station, terminal, relay, and transmitting point. This patent refers collectively to these transmitting devices as transmitting node.

Figure 1:
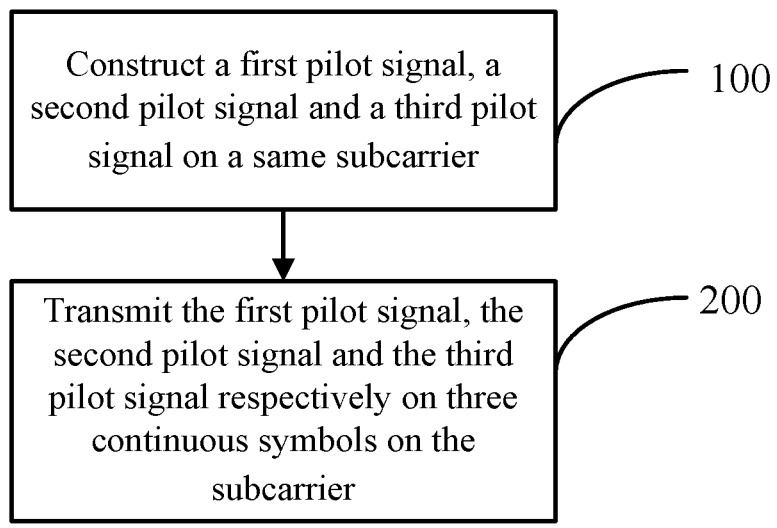
FIG. 1 is a schematic flow chart of a pilot signal transmission method according to an embodiment of the present disclosure.

An embodiment of the present disclosure proposes a pilot signal transmission method for a transmitting node to transmit pilot signals. With reference to FIG. 1, the method includes the steps described below.

In step 100, a first pilot signal, a second pilot signal, and a third pilot signal are set on a same subcarrier;

In step 200, the first pilot signal, the second pilot signal, and the third pilot signal are transmitted respectively on three consecutive symbols on the same subcarrier.

The first pilot signal, the second pilot signal, and the third pilot signal are all nonzero data; a phase difference between the first pilot signal and the second pilot signal is 90 degrees; a phase difference between the third pilot signal and the second pilot signal is 90 degrees; and a phase difference between the first pilot signal and the third pilot signal is 180 degrees.

In the embodiment of the present disclosure, the pilot signals are transmitted by adopting three consecutive symbols, and the interference of data on the symbols preceding the first symbol and the symbols subsequent to the third symbol on the pilot signals on the second symbol can be isolated. A phase difference between the pilot data element transmitted on the first symbol and the pilot data element transmitted on the second symbol is 90 degrees, and the phase difference of 90 degrees can increase the signal-to-noise ratio of joint demodulation of the pilot signals in the same direction. A phase difference between the pilot data element transmitted on the third symbol and the pilot data element transmitted on the second symbol is 90 degrees, and similarly, the phase difference of 90 degrees can increase the signal-to-noise ratio of joint demodulation of the pilot signals in the same direction. A phase difference between the pilot data element transmitted on the first symbol and the pilot data elements transmitted on the third symbol is 180 degrees, and the phase difference of 180 degrees has the following advantages: the pilot signals at two sides can not only increase the signal-to-noise ratio of joint detection of pilot point signals of an intermediate symbol on the same subcarrier in the same direction, but also has the interferences of the pilot signals at two sides on the pilot signals of the intermediate symbol on the adjacent subcarrier be mutually cancelled out. The pilot data elements transmitted on the three symbols have the same amplitude. As such, the interferences of the pilot signals at two sides on the pilot signals of an intermediate symbol on the adjacent subcarrier can be completely cancelled out, thereby achieving a better signal-to-noise ratio of joint detection of the pilot signals of the three symbols. The embodiments of the present disclosure can save resources for interference separation since there is no need for additional empty symbols to isolate interference of other data symbols on the pilot symbols, thereby reducing the pilot overhead. Moreover, the cancellation of interference can improve the channel estimation performance of a receiving terminal.

In an embodiment of the present disclosure, the pilot signals transmitted on the first symbol and the third symbol are non-zero signals.

In an embodiment, the pilot signal transmitted on the first symbol and the pilot signal transmitted on the second symbol have the same amplitude and a phase difference of 90 degrees; the pilot signal transmitted on the third symbol and the pilot signal transmitted on the second symbol have the same amplitude and a phase difference of 90 degrees; the pilot signal transmitted on the first symbol and the pilot signal transmitted on the third symbol has a phase difference of 180 degrees.

Below is the description in connection with one example.

Pilot signals are transmitted on the first to the third symbols on a mth subcarrier corresponding to an antenna. The pilot signal transmitted on the first symbol is j*X(m), the pilot signal transmitted on the second symbol is X(m), and the pilot signal transmitted on the second symbol is −j*X(m), where j is a square root of −1, and X(m) is real pilot data on the subcarrier m. For yet another example, the pilot signals respectively transmitted on the first to the third symbols on the mth subcarrier may be −j*X(m), X(m), j*X(m). In addition, X(m) may be real pilot data or complex pilot data or pure imaginary pilot data element. In an embodiment of the present disclosure, the pilot signals are transmitted on consecutive subcarriers in frequency domain; or, the pilot signals are transmitted on subcarriers, which are distributed at equal frequency intervals, in frequency domain.

Below is the description in connection with specific examples.

Figure 2:
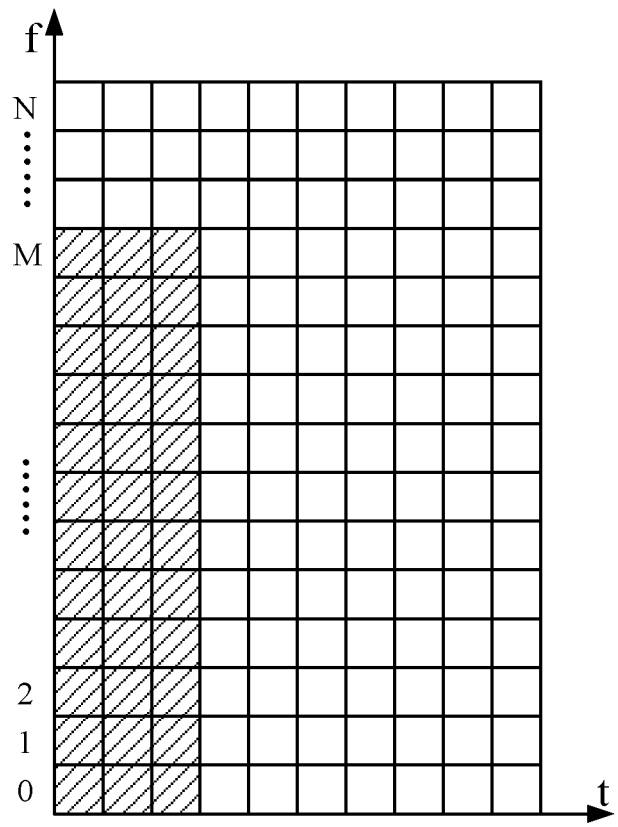
FIG. 2 is a schematic diagram illustrating transmission of pilot signals on consecutive subcarriers in frequency domain according to an embodiment of the present disclosure.

As shown in FIG. 2, it is a schematic diagram illustrating transmission of pilot signals on consecutive subcarriers in frequency domain according to an embodiment of the present disclosure.

The abscissa represents time t, in which each grid has a length representing a length or interval of each symbol in FBMC-OQAM. The ordinate represents frequency f, in which each grid has a length representing a width or interval of each subcarrier. In time domain, the first three symbols from left to right are pilot symbols, i.e., a first symbol, a second symbol, and a third symbol. In frequency domain, it is assumed that the subcarriers are sequentially numbered 0, 1, 2, ... N from bottom to top, and the subcarriers transmitting the pilot signals are sequentially numbered 0, 1, 2, ... M from bottom to top, where M<=N. In other words, a sequence of subcarriers for transmitting the pilot signals may occupy the entire transmission bandwidth, and may also occupy a part of the transmission bandwidth.

In FIG. 2, the shaded part represents time-frequency resources used for transmitting the pilot signals, where a total of 15 subcarriers are included. The 0th to the 11th subcarriers are used for transmitting the pilot signals. For the subcarriers transmitting the pilot signals, the pilot signals are transmitted in three symbols.

That is, in this example, the description is given by taking N=14 and M=11 as an example. A formula m=A*k+a is used for indicating the subcarriers transmitting the pilot signals. In this example, A=1, a=0, k=0, 1, ... 11 in the formula; where m is a serial number of the subcarrier transmitting the pilot signal.

Therefore, for the subcarrier m transmitting pilot signals, the pilot signals transmitted on three symbols may sequentially be j*X(m), X(m), −j*X(m), where m is a serial number of the subcarrier, m=0, 1, 2, ... , 11. The time-frequency resources of the non-shaded part in FIG. 2 transmit other data.

Table 1 shows pilot signals transmitted on each subcarrier in the example given in connection with FIG. 2.

| Serial Number m of Subcarrier | First Symbol | Second Symbol | Third Symbol |
|---|---|---|---|
| 11 | j | 1 | −j |
| 10 | j | 1 | −j |
| 9 | −j | −1 | j |
| 8 | −j | −1 | j |
| 7 | j | 1 | −j |

-continued

| Serial Number m of Subcarrier | First Symbol | Second Symbol | Third Symbol |
|---|---|---|---|
| 6 | j | 1 | −j |
| 5 | −j | −1 | j |
| 4 | −j | −1 | j |
| 3 | j | 1 | −j |
| 2 | j | 1 | −j |
| 1 | −j | −1 | j |
| 0 | −j | −1 | j |

For different subcarriers, values of X(m) may be set to be different or the same. In this example, the value of X(m) is 1 or −1.

Figure 3:
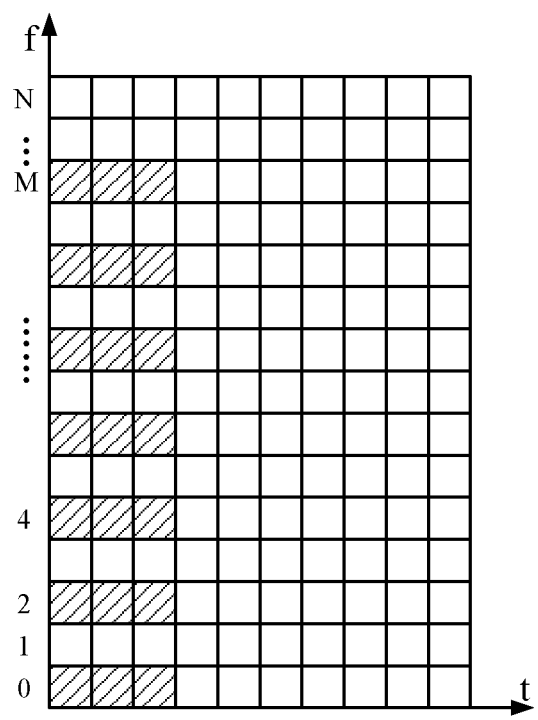
FIG. 3 is a schematic diagram illustrating transmission of pilot signals on subcarriers distributed at equal frequency intervals in frequency domain according to an embodiment of the present disclosure.

FIG. 3 is a schematic diagram illustrating transmission of pilot signals on subcarriers distributed at equal frequency intervals in frequency domain according to an embodiment of the present disclosure.

FIG. 3 is a scenario in which pilot signals are transmitted on subcarriers distributed at equal frequency intervals in frequency domain. In time domain, the first three symbols from left to right are pilot symbols, i.e., a first symbol, a second symbol, and a third symbol. In frequency domain, it is assumed that the subcarriers are sequentially numbered 0, 1, 2, . . . N from bottom up, and that the subcarrier m transmitting the pilot signals is sequentially numbered 0, 2, 4, . . . M from bottom up, where M<=N. FIG. 3 shows an example in which M=12. If the formula m=A*k+a is used, then A=2, a=0, k=0, 1, . . . 6 in the formula. Therefore, the pilot signals transmitted on time-frequency resources of the shaded part in FIG. 3 are j*X(m), X(m), and −j*X(m), where m is a serial number of the subcarrier, and m=0, 2, . . . 12. The-time frequency resources in the non-shaded part in FIG. 2 transmit other data.

Table 2 shows pilot signals transmitted on each subcarrier in the example given in connection with FIG. 3.

| Serial Number m of Subcarrier | First Symbol | Second Symbol | Third Symbol |
|---|---|---|---|
| 12 | j | 1 | −j |
| 11 | | | |
| 10 | j | 1 | −j |
| 9 | | | |
| 8 | −j | −1 | j |
| 7 | | | |
| 6 | j | 1 | −j |
| 5 | | | |
| 4 | −j | −1 | j |
| 3 | | | |
| 2 | j | 1 | −j |
| 1 | | | |
| 0 | −j | −1 | j |

For different subcarriers, values of X(m) may be set to be different or the same. In this example, the value of X(m) is 1 or −1.

In the above example, the description is given by taking subcarriers on one antenna as an example. The description below is given by taking a scenario in which multiple antennas are disposed on a transmitting terminal as an example. In a LTE system, a logical antenna is generally defined by using an antenna port. In the embodiment of the present disclosure, the number of the antennas is also expressed as the number of the antenna ports, and each antenna is also expressed as each antenna port. For convenience, in the embodiment of the present disclosure, the antenna and the antenna port are collectively referred to as the antenna, the number of the antennas and the number of the antenna ports are collectively referred to as the number of the antennas.

The pilot signal transmission method provided in the above embodiment may be used on one transmission antenna or on multiple transmission antennas (that is, this method will be employed in each antenna).

In an embodiment of the present disclosure, when the number of the antennas disposed in the transmitting terminal is P*Q, and the number of subcarriers corresponding to each antenna is N, the antennas of the transmitting terminal are divided into Q groups each including P antennas, where P and Q are positive integers, the pilot signals on the subcarriers corresponding to the antennas of a same group occupy the same symbols in time domain; and the pilot signals on the subcarriers corresponding to the antennas of different groups occupy partially or completely different symbols in time domain. For example, there are two groups, i.e., a group 1 and a group 2, of antennas. For instance, the group 1 occupies symbols 1, 2 and 3 to transmit the pilot signals, and the group 2 occupies symbols 3, 4 and 5 to transmit the pilot signals.

In an embodiment, any two of the P antennas of the same group respectively transmit the pilot signals on different subcarriers in frequency domain.

In an embodiment, pilot signals are set on the jth subcarrier corresponding to the ith antenna of the P antennas of the same group;

where i is an integer greater than 0 and less than or equal to P;

where j=a1*k+b1[i]; where a1 is a positive integer greater than or equal to P, b1[i] is a non-negative integer less than a1 and corresponding to the $i^{th}$ antenna, and values of b1[i] corresponding to different antennas are different; k is a non-negative integer and forms an arithmetic progression; a1, k and b1[i] are set to have a value of j less than or equal to N.

In the embodiment of the present disclosure, in the same group of P antennas, each of the sequences m1, m2, . . . mP of subcarriers is a sequence of subcarriers which are distributed at equal intervals; where m1 is a sequence of subcarriers for transmitting pilot signals on an antenna 1, m2 is a sequence of subcarriers for transmitting pilot signals on an antenna 2, and so on, mP is a sequence of subcarriers for transmitting pilot signals on an antenna P. Moreover, the sequences m1, m2, . . . mP of the subcarriers constitute a sequence of subcarriers which are continuously distributed. For example, P is 4, m1 is [0, 4, 8], m2 is [1, 5, 9], m3 is [2, 6, 10], m4 is [3, 7, 11], and the sequences m1, m2, m3 and m4 of the subcarriers constitute a sequence of subcarriers [0, 1, 2, 3, 4, 5, 6, 7, 8, 9, 10, 11] which are continuously distributed.

Below is the description in connection with specific examples.

Figure 4A:
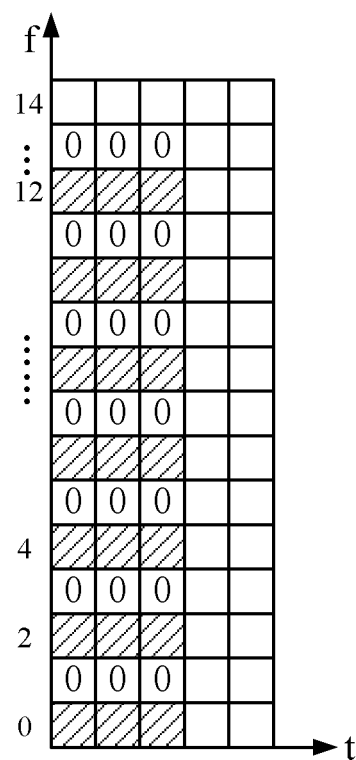
FIG. 4A and FIG. 4B are schematic diagrams illustrating setting of pilot signals transmitted on subcarriers of two transmitting antennas according to an embodiment of the present disclosure.
Figure 4B:
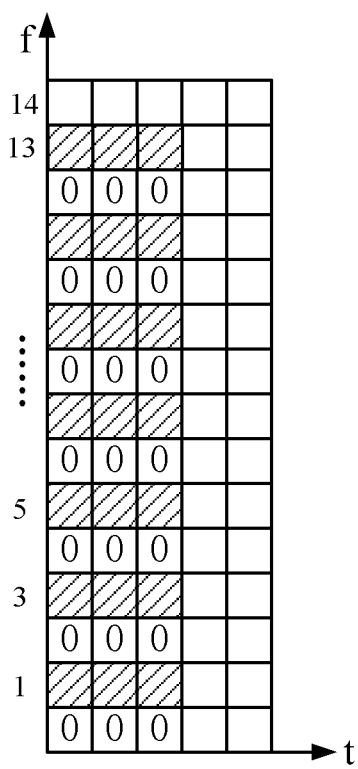

FIGS. 4A and 4B are schematic diagrams illustrating setting of pilot signals transmitted on subcarriers of two transmitting antennas according to an embodiment of the present disclosure.

The description is given by taking an example where the number of transmitting antennas of a transmitting terminal is 2. The sequence m1 of subcarriers, carrying the pilot signals, transmitted on the antenna 1 and the sequence m2 of subcarriers, carrying the pilot signals, transmitted on the antenna 2 are staggered in frequency domain. That is, m1 is not identical to m2. The m1 and m2 are expressed by using formulae: m1=a1*k+c1 and m2=a1*k+c2, where a1 is a positive integer greater than 1; c1 and c2 are non-negative integers and less than a1, and c1 is not equal to c2; k is a sequence of integers with a certain length; where the sequence of integers is an arithmetic progression with an equal difference of one.

In an embodiment, when the number of transmitting antennas of the transmitting terminal is 2, the sequence m1 of subcarriers for transmitting the pilot signals on the antenna 1 is a sequence of subcarriers distributed at equal intervals, and the sequence m2 of subcarriers for transmitting the pilot signals on the antenna 2 is a sequence of subcarriers distributed at equal intervals, and the sequence m1 of subcarriers and the sequence m2 of subcarriers constitute a sequence of subcarriers continuously distributed, that is, m1=2*k+d, m2=2*k+d+1, where d=0 or 1, and k is a sequence of integers with a certain length.

In an embodiment, when the number of the transmitting antennas of the transmitting terminal is 2, the sequence m1 of subcarriers for transmitting the pilot signals on the antenna 1 is a sequence of subcarriers distributed at equal intervals, and the sequence m2 of subcarriers for transmitting the pilot signals on the antenna 2 is a sequence of subcarriers distributed at equal intervals, and when the sequence m1 of subcarriers and the sequence m2 of subcarriers constitute a sequence of subcarriers distributed continuously, signal data, which are transmitted on three symbols the same as symbols for transmitting the pilot signals, on the sequence m1−1 or m1+1 of subcarriers on the antenna 1 are 0, 0, 0, and signal data, which are transmitted on three symbols the same as symbols for transmitting the pilot signals, on the sequence m2−1 or m2+1 of subcarriers on the antenna 2 are 0, 0, 0. The fact that the signal data is 0 indicates that no data is transmitted on the time-frequency resource, or that there is no signal power on the time-frequency resource. The advantage of setting the data element to 0 on a resource corresponding to one antenna is to reduce the interference of the antenna on the pilot signals on the other antenna.

FIG. 4A is a schematic diagram showing distribution of subcarriers for transmitting pilot signals on an antenna 1. FIG. 4B is a schematic diagram showing distribution of subcarriers for transmitting pilot signals on an antenna 2. The sequence m1 of subcarriers carrying the pilot signals transmitted on the antenna 1 is 0, 2, ... 12, and signal data, which are transmitted on three symbols the same as symbols for transmitting the pilot signals, on the sequence m1+1 (i.e., 1, 3, ... 13) of subcarriers on the antenna 1 are 0, 0, 0. The sequence m2 of subcarriers carrying the pilot signals transmitted on the antenna 2 is 1, 3, ... 13, and signal data, which are transmitted on three symbols the same as symbols for transmitting the pilot signals, on the sequence m1−1 (i.e., 0, 2, ... 12) of subcarriers on the antenna 2 are 0, 0, 0.

In an embodiment, when the number of transmitting antennas of the transmitting terminal is 2, the sequence m1 of subcarriers for transmitting the pilot signals on the antenna 1 is a sequence of subcarriers distributed at equal intervals, and the sequence m2 of subcarriers for transmitting the pilot signals on the antenna 2 is a sequence of subcarriers distributed at equal intervals, and the sequence m1 of subcarriers and the sequence m2 of subcarriers constitute a sequence of subcarriers distributed continuously, when pilot signals are transmitted on a subcarrier m1 on the antenna 1, signal data, which are transmitted on three symbols the same as symbols for transmitting the pilot signals, on the sequence m1−1 of subcarriers on the antenna 1 are 0, I(m1−1), 0; and signal data, which are transmitted on three symbols the same as symbols for transmitting the pilot signals, on the sequence m1+1 of subcarriers on the antenna 1 are 0, I(m1+1), 0. The I (m1−1) or I (m1+1) is calculated from X (m1). The advantage of setting a data element to I(m1−1) or I(m1+1) on a resource corresponding to one antenna is to reduce the interference of this antenna on the pilot signals on the other antenna.

In an embodiment, the I(m1+1) is calculated according to a formula containing X(m1); and/or, the I(m1−1) is calculated according to a formula containing X(m1);

where the formula containing X(m1) used for calculating the I(m1+1) is:

$$I(m1+1)=X(m1)\langle g \rangle_{m1}^{m1+1}, \text{ or}$$

$$I(m1+1)=X(m1)\langle g \rangle_{m1}^{m1+1}+X(m1+2)\langle g \rangle_{m1+2}^{m1+1};$$

where $$\langle g \rangle_{m1}^{m1+1} = \int g_{m1}(t)g^*_{m1+1}(t)dt, \text{ and}$$

$$\langle g \rangle_{m1+2}^{m1+1} = \int g_{m1+2}(t)g^*_{m1+1}(t)dt,$$

where "*" is a conjugate operation, $g_{m1}$ is a prototype filter function for the second symbol of the three pilot symbols on the subcarrier m1; $g_{m1+1}$ is a prototype filter function for the second symbol of the three pilot symbols on the subcarrier m1+1; $g_{m1+2}$ is a prototype filter function for the second symbol of the three pilot symbols on the subcarrier m1+2;

the formula containing X(m1) used for calculating the I(m1−1) is:

$$I(m1-1)=-X(m1)\langle g \rangle_{m1}^{m1-1}, \text{ or}$$

$$I(m1-1)=-X(m1)\langle g \rangle_{m1}^{m1-1}-X(m1+2)\langle g \rangle_{m1+2}^{m1-1},$$

where $$\langle g \rangle_{m1}^{m1-1} = \int g_{m1}(t)g^*_{m1-1}(t)dt, \text{ and}$$

$$\langle g \rangle_{m1+2}^{m1-1} = \int g_{m1+2}(t)g^*_{m1-1}(t)dt,$$

where "*" is a conjugate operation, $g_{m1}$ is a prototype filter function for the second symbol of the three pilot symbols on the subcarrier m1; $g_{m1-1}$ is a prototype filter function for the second symbol of the three pilot symbols on the subcarrier m1−1; $g_{m1+2}$ is a prototype filter function for the second symbol of the three pilot symbols on the subcarrier m1+2.

When there are pilot signals transmitted on the subcarrier m2 on the antenna 2, signal data, which are transmitted on three symbols the same as symbols of transmitting the pilot signals, on the sequence m2−1 of subcarriers on the antenna 2 are 0, I(m2−1), 0; signal data transmitted on the sequence m2+1 of subcarriers on the antenna 2 are 0, I(m2+1), 0. The I(m2−1) or I(m2+1) is calculated from X(m2).

The fact that the signal data is 0 indicates that no data is transmitted on the time-frequency resource or that there is no signal power on the time frequency resource. Since the signal data 0 may also be referred to as one kind of pilot data, and the signal data I(m1−1) or I(m1+1) or I(m2−1) or I(m2+1) may also be referred to as one kind of pilot data.

Figure 5A:
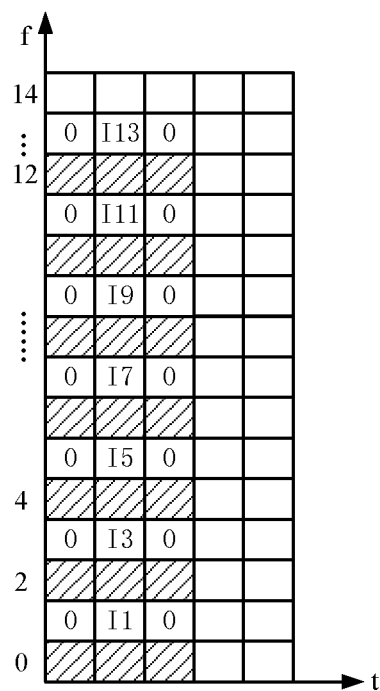
FIG. 5A and FIG. 5B are schematic diagrams illustrating another setting of pilot signals transmitted on subcarriers of two transmitting antennas according to an embodiment of the present disclosure.
Figure 5B:
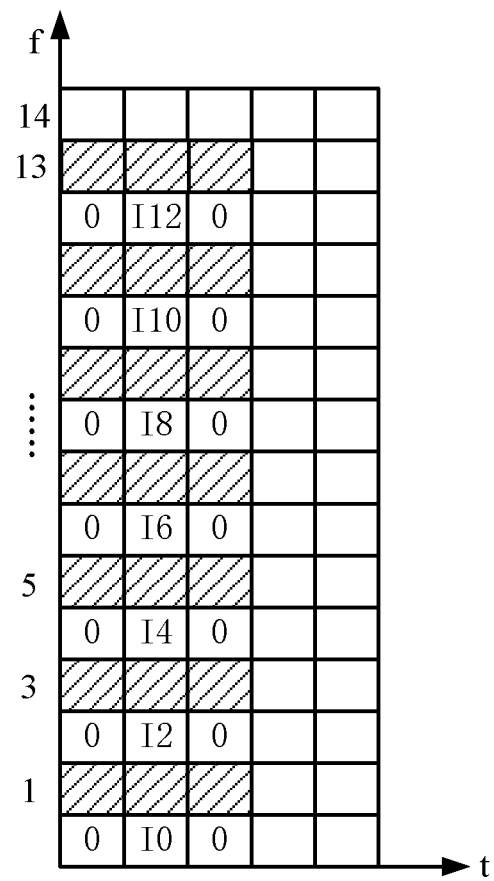

FIGS. 5A and 5B are schematic diagrams illustrating another setting of pilot signals transmitted on subcarriers of two transmitting antennas on time-frequency physical resources of an FBMC-OQAM system according to an embodiment of the present disclosure.

In FIG. 5A, the sequence m1 of subcarriers carrying the pilot signals transmitted on the antenna 1 is 0, 2, ... 12, and signal data, which are transmitted on three symbols the same as symbols for transmitting the pilot signals, on the sequence m1+1 (i.e., 1, 3, . . . 13) of subcarriers on the antenna 1 are 0, I(m1+1), 0. In FIG. 5B, the sequence m2 of subcarriers carrying the pilot signals transmitted on the antenna 2 is 1, 3, . . . 13, and signal data, which are transmitted on three symbols the same as symbols for transmitting the pilot signals, on the sequence m2−1 (i.e., 0, 2, . . . 12) of subcarriers on the antenna 2 are 0, I(m2−1), 0.

I(m1+1) is calculated from X(m1), and I(m2−1) is calculated from X(m2). That is, in FIG. 5A, I1, I3, . . . I13 on the resource of the symbol 2 are respectively calculated from X(0), X(2), . . . X(12) on a pilot resource; and in FIG. 5B, I0, I2, . . . I12 on the resource of the symbol are respectively calculated from X(1), X(3), . . . X(13) on the pilot resource.

Figure 6:
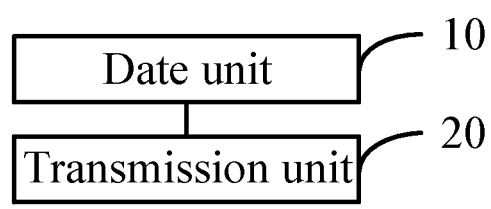
FIG. 6 is a schematic diagram illustrating a structure of a pilot signal transmission apparatus according to an embodiment of the present disclosure.

Based on the concept identical or similar to that in the foregoing embodiment, an embodiment of the present disclosure further provides a pilot signal transmission apparatus. With reference to FIG. 6, the pilot signal transmission apparatus provided by the embodiment of the present disclosure includes:

a data unit 10, which is configured to set a first pilot signal, a second pilot signal, and a third pilot signal on a same subcarrier;

a transmission unit 20, which is configured to transmit the first pilot signal, the second pilot signal, and the third pilot signal respectively on three consecutive symbols on the same subcarrier;

the first pilot signal, the second pilot signal, and the third pilot signal are all nonzero data;

a phase difference between the first pilot signal and the second pilot signal is 90 degrees;

a phase difference between the third pilot signal and the second pilot signal is 90 degrees; and a phase difference between the first pilot signal and the third pilot signal is 180 degrees.

In an embodiment of the present disclosure, the first pilot signal, the second pilot signal, and the third pilot signal have the same amplitude.

In an embodiment of the present disclosure, the first pilot signal, the second pilot signal, and the third pilot signal set by the data unit 10 are respectively −j*X(m), X(m), and j*X(m); or the first pilot signal, the second pilot signal, and the third pilot signal set by the data unit 10 are respectively j*X(m), X(m), and −j*X(m);

where X(m) is real pilot data or complex pilot data or imaginary pilot data.

In an embodiment of the present disclosure, the pilot signals are transmitted on consecutive subcarriers in frequency domain; or the pilot signals are transmitted on subcarriers distributed at equal frequency intervals in frequency domain.

In an embodiment of the present disclosure, the data unit 10 is further configured to set pilot signals transmitted on subcarriers corresponding to each of antennas disposed in a transmitting terminal;

the number of the antennas disposed in the transmitting terminal is P*Q, and the number of the subcarriers corresponding to each antenna is N;

the antennas of the transmitting terminal are divided into Q groups, each of the Q groups includes P antennas, where P and Q are positive integers, the antennas of a same group each is set to occupy same symbols to transmit the pilot signals; and any two antennas in different groups are set to occupy partially or completely different symbols in time domain to transmit the pilot signals.

In an embodiment of the present disclosure, any two of the P antennas of the same group separately transmit the pilot signals on different subcarriers in frequency domain.

In an embodiment of the present disclosure, in the same group of P antennas, the pilot signals are set on the jth subcarrier corresponding to the ith antenna of the P antennas of the same group;

where i is an integer greater than 0 and less than or equal to P;

where j=a1*k+b1[i]; where a1 is a positive integer greater than or equal to P, b1[i] is a non-negative integer less than a1 and corresponding to the ith antenna, and values of b1[i] corresponding to different antennas are different; k is a non-negative integer and forms an arithmetic progression; a1, k and b1[i] are set to have a value of j less than or equal to N.

In an embodiment of the present disclosure, the data unit 10 is further configured to: in the P antennas of the same group, when the pilot signals are transmitted on the subcarriers of the P antennas continuously distributed at intervals in frequency domain and when the ith antenna transmits the pilot signals on a subcarrier m1, on three symbols the same as three symbols for transmitting the pilot signals, set signal data transmitted on the subcarrier m1−1 on the ith antenna to 0, I(m1−1), 0; and set signal data transmitted on the subcarrier m1+1 on the ith antenna to 0, I(m1+1), 0; where the I(m1+1) is calculated according to a formula containing X(m1); and/or the I(m1−1) is calculated according to the formula containing X(m1).

In an embodiment of the present disclosure, the formula containing X(m1) used for calculating the I(m1+1) is:

$I(m1+1) = X(m1)\langle g \rangle_{m1}^{m1+1}$, or $I(m1+1) = X(m1)\langle g \rangle_{m1}^{m1+1} + X(m1+2)\langle g \rangle_{m1+2}^{m1+1}$;

where $\langle g \rangle_{m1}^{m1+1} = \int g_{m1}(t) g^*_{m1+1}(t) dt$, and $\langle g \rangle_{m1+2}^{m1+1} = \int g_{m1+2}(t) g^*_{m1+1}(t) dt$, where "*" is a conjugate operation, $g_{m1}$ is a filter function for the second symbol of the three pilot symbols on the subcarrier m1; $g_{m1+1}$ is a filter function for the second symbol of the three pilot symbols on the subcarrier m1+1; $g_{m1+2}$ is a filter function for the second symbol of the three pilot symbols on the subcarrier m1+2;

the formula containing X(m1) used for calculating the I(m1−1) is:

$I(m1-1) = -X(m1)\langle g \rangle_{m1}^{m1-1}$, or $I(m1-1) = -X(m1)\langle g \rangle_{m1}^{m1-1} - X(m1+2)\langle g \rangle_{m1+2}^{m1-1}$, where "*" is a conjugate operation, $g_{m1}$ is a prototype filter function for the second symbol of the three pilot symbols on the subcarrier m1; $g_{m1-1}$ is a prototype filter function for the second symbol of the three pilot symbols on the subcarrier m1−1; and $g_{m1+2}$ is a prototype filter function for the second symbol of the three pilot symbols on the subcarrier m1+2.

Based on the concept identical or similar to that of the above-described embodiment, an embodiment of the present disclosure further provides a transmitting terminal, including any one of the above pilot signal transmission apparatus provided by the embodiments of the present disclosure.

Receiving devices on a receiving terminal include base station, terminal, relay and the like. These receiving devices are collectively referred to as receiving nodes. The receiving nodes receive the pilot data for channel estimation, and then demodulate the data or determine channel state information. Compared with the related art, the pilot signal transmission method and apparatus provided by the embodiments of the present disclosure can improve the channel estimation performance of the receiving nodes.

The pilot signal transmission method and apparatus provided by the embodiments of the present disclosure may be used in FBMC-OQAM or other FBMC systems, or more generally, and may also be used in other multicarrier systems. In other FBMC systems, e.g., a GFDM (Generalized Frequency Division Multiplexing) system, it is also necessary to provide a good pilot signal design. When the length of a symbol of the GFDM system is twice the length of a symbol of the FBMC-OQAM system, the three symbols of transmitting the pilot signals are distributed at intervals of half the length of the symbol of the GFDM system. That is, one pilot symbol is respectively inserted at a position from each of two sides by a length of half the length of the symbol of one pilot symbol n of the GFDM system. Other contents in the pilot signal transmission method and apparatus provided by the embodiments of the present disclosure are identical or similar to those in the FBMC-OQAM system.

The pilot signal transmission method and apparatus provided by the embodiments of the present disclosure can not only increase the signal-to-noise ratio of joint detection of pilot point signals, but also cancel the interference between adjacent subcarriers and the interference between the antennas, and can also save physical time-frequency resources for interference separation. Therefore, with the pilot signal transmission method and apparatus provided by the embodiments of the present disclosure, the channel estimation performance of the FBMC system or other systems using time-frequency resources as physical resources can be improved well, and the pilot overhead is low.

An embodiment of the present disclosure further provides a computer storage medium. Computer-executable instructions are stored in the computer storage medium. The computer-executable instructions are used for executing the method described in the above embodiments.

A person ordinarily skilled in the art may understand that all or a part of steps in the above method may be implemented by a program to instruct related hardware (for example, a processor), and the program may be stored in a computer-readable storage medium, such as a read-only memory, a magnetic disk, or a compact disk. Alternatively, all or a part of the steps of the above embodiments may also be implemented by using one or more integrated circuits. Correspondingly, each module/unit in the above embodiments may be implemented in the form of hardware, for example, its corresponding function may be realized by an integrated circuit, or each module/unit in the above embodiments may be implemented in the form of a software function module, for example, its corresponding function is realized by a processor to execute a program/instruction stored in a memory. The present disclosure is not limited to any specific combination of hardware and software.

It should be noted that the foregoing embodiments are merely for facilitating understanding by those skilled in the art and are not used to limit the protection scope of the present disclosure, any apparent substitutions and improvements made to the disclosure by those skilled in the art are within the protection scope of the present disclosure without departing from the inventive concept of the present disclosure.

INDUSTRIAL APPLICABILITY

The pilot signal transmission method and apparatus, as well as the transmitting terminal, can save resources for interference separation, thereby reducing the pilot overhead. Moreover, the cancellation of interference can improve the channel estimation performance of a receiving terminal. Accordingly, it is also possible to improve the channel estimation performance of a FBMC system or other systems using time frequency resources as physical resources while keeping low pilot overhead.

What is claimed is:

1. A pilot signal transmission method, comprising:
    setting a first pilot signal, a second pilot signal, and a third pilot signal on a same subcarrier; and
    transmitting the first pilot signal, the second pilot signal, and the third pilot signal respectively on three consecutive symbols on the same subcarrier;
    wherein:
        the first pilot signal, the second pilot signal, and the third pilot signal are all nonzero data;
        a phase difference between the first pilot signal and the second pilot signal is 90 degrees;
        a phase difference between the third pilot signal and the second pilot signal is 90 degrees; and
        a phase difference between the first pilot signal and the third pilot signal is 180 degrees,
    wherein the method is performed by at least one processor.

2. The pilot signal transmission method according to claim 1, wherein the first pilot signal, the second pilot signal, and the third pilot signal have a same amplitude.

3. The pilot signal transmission method according to claim 1, wherein
    the first pilot signal, the second pilot signal, and the third pilot signal are respectively $-j*X(m)$, $X(m)$, and $j*X(m)$; or,
    the first pilot signal, the second pilot signal, and the third pilot signal are respectively $j*X(m)$, $X(m)$, and $-j*X(m)$;
    wherein $X(m)$ is real pilot data, or complex pilot data, or imaginary pilot data.

4. The pilot signal transmission method according to claim 2, wherein
    a plurality of pilot signals are transmitted on consecutive subcarriers in frequency domain; or
    the pilot signals are transmitted on subcarriers distributed at equal frequency intervals in frequency domain.

5. The pilot signal transmission method according to claim 2, further comprising:
    setting a plurality of pilot signals transmitted on a plurality of subcarriers corresponding to each of a plurality of antennas disposed in a transmitting terminal;
    wherein:
        a number of the antennas disposed in the transmitting terminal is $P*Q$;
        the antennas of the transmitting terminal are divided into Q groups, the Q groups each comprises P antennas, wherein P and Q are positive integers;
        the antennas of a same group each occupies a plurality of same symbols to transmit the pilot signals; and
        any two antennas in different groups occupy partially or completely different symbols on time domain to transmit the pilot signals.

6. The pilot signal transmission method according to claim 5, further comprises:
    transmitting, by any two of the P antennas of the same group, the pilot signals on different subcarriers in frequency domain.

7. The pilot signal transmission method according to claim 6, wherein the pilot signals are set on a jth subcarrier corresponding to an ith antenna of the P antennas of the same group;

wherein i is an integer greater than 0 and less than or equal to P;

wherein j=a1*k+b1[i]; wherein a1 is a positive integer greater than or equal to P, b1[i] is a non-negative integer less than a1 and corresponding to the ith antenna, and values of b1[i] corresponding to different antennas are different; k is a non-negative integer and forms an arithmetic progression.

8. The pilot signal transmission method according to claim 6, wherein in the P antennas of the same group, in response to determining that the pilot signals are transmitted on the subcarriers of P antennas continuously distributed at intervals in frequency domain and in response to determining that an ith antenna transmits the pilot signals on a subcarrier m1, on three symbols the same as three symbols for transmitting the pilot signals, signal data transmitted on a subcarrier m1−1 of the ith antenna are set to 0, I(m1−1), 0; signal data transmitted on a subcarrier m1+1 of the ith antenna are set to 0, I(m1+1), 0; wherein the I(m1+1) is calculated according to a formula containing X(m1), and/or the I(m1−1) is calculated according to a formula containing X(m1).

9. The pilot signal transmission method according to claim 8, wherein the formula containing X(m1) used for calculating the I(m1+1) is:

$I(m1+1)=X(m1)\langle g\rangle_{m1}^{m1+1}$, or $I(m1+1)=X(m1)\langle g\rangle_{m1}^{m1+1}+X(m1+2)\langle g\rangle_{m1+2}^{m1+1}$;

wherein $\langle g\rangle_{m1}^{m1+1}=\int g_{m1}(t)g^*_{m1+1}(t)dt$, and $\langle g\rangle_{m1+2}^{m1+1}=\int g_{m1+2}(t)g^*_{m1+1}(t)dt$, wherein "*" is a conjugate operation, $g_{m1}$ is a filter function for the second symbol of the three pilot symbols on the subcarrier m1; $g_{m1+1}$ is a filter function for the second symbol of the three pilot symbols on the subcarrier m1+1; $g_{m1+1}$ is a filter function for the second symbol of the three pilot symbols on the subcarrier m1+2;

the formula containing X(m1) used for calculating the I(m1−1) is:

$I(m1-1)=-X(m1)\langle g\rangle_{m1}^{m1-1}$, or $I(m1-1)=-X(m1)\langle g\rangle_{m1}^{m1-1}-X(m1+2)\langle g\rangle_{m1+2}^{m1-1}$, wherein "*" is a conjugate operation, $g_{m1}$ is a prototype filter function for the second symbol of the three pilot symbols on the subcarrier m1; $g_{m1-1}$ is a prototype filter function for the second symbol of the three pilot symbols on the subcarrier m1−1; and $g_{m1+2}$ is a prototype filter function for the second symbol of the three pilot symbols on the subcarrier m1+2.

10. A pilot signal transmission apparatus, comprising:

a processor; and a memory for storing instructions executable by the processor, wherein the processor is configured to:

set a first pilot signal, a second pilot signal, and a third pilot signal on a same subcarrier; and transmit the first pilot signal, the second pilot signal, and the third pilot signal respectively on three consecutive symbols on the same subcarrier;

wherein:

the first pilot signal, the second pilot signal, and the third pilot signal are all nonzero data;

a phase difference between the first pilot signal and the second pilot signal is 90 degrees;

a phase difference between the third pilot signal and the second pilot signal is 90 degrees; and a phase difference between the first pilot signal and the third pilot signal is 180 degrees.

11. The pilot signal transmission apparatus according to claim 10, wherein the first pilot signal, the second pilot signal, and the third pilot signal have a same amplitude.

12. The pilot signal transmission apparatus according to claim 10, wherein the first pilot signal, the second pilot signal, and the third pilot signal are respectively −j*X(m), X(m), and j*X(m); or the first pilot signal, the second pilot signal, and the third pilot signal are respectively j*X(m), X(m), and −j*X(m);

wherein X(m) is real pilot data, or complex pilot data, or imaginary pilot data.

13. The pilot signal transmission apparatus according to claim 11, wherein the processor is configured to transmit a plurality of pilot signals on consecutive subcarriers in frequency domain; or transmit the pilot signals on subcarriers distributed at equal frequency intervals in frequency domain.

14. The pilot signal transmission apparatus according to claim 11, wherein the processor is further configured to: set a plurality of pilot signals transmitted on a plurality of subcarriers corresponding to each of a plurality of antennas disposed in a transmitting terminal;

wherein a number of the antennas disposed in the transmitting terminal is P*Q;

the antennas of the transmitting terminal are divided into Q groups, the Q groups each comprises P antennas, wherein P and Q are positive integers, the antennas of a same group each is set to occupy a plurality of same symbols to transmit the pilot signals;

any two antennas in different groups are set to occupy partially or completely different symbols in time domain to transmit the pilot signals.

15. The pilot signal transmission apparatus according to claim 14, wherein the processor is further configured to separately transmit the pilot signals on different subcarriers in frequency domain through any two of the P antennas of the same group.

16. The pilot signal transmission apparatus according to claim 15, wherein the processor is configured to transmit the pilot signals on the subcarrier through each of the P antennas of the same group in the following manner:

setting the pilot signals on a jth subcarrier corresponding to an ith antenna of the P antennas of the same group;

wherein i is an integer greater than 0 and less than or equal to P;

wherein j=a1*k+b1[i]; wherein a1 is a positive integer greater than or equal to P, b1[i] is a non-negative integer less than a1 and corresponding to the ith antenna, and values of b1[i] corresponding to different antennas are different; k is a non-negative integer and forms an arithmetic progression.

17. The pilot signal transmission apparatus according to claim 15, wherein
the processor is further configured to: in the P antennas of the same group, in response to determining that the pilot signals are transmitted on the subcarriers of the P antennas continuously distributed at intervals in frequency domain and in response to determining that an ith antenna transmits the pilot signals on a subcarrier m1, on three symbols the same as three symbols for transmitting the pilot signals, set signal data transmitted on a subcarrier m1−1 on the ith antenna to 0, I(m1−1), 0; set signal data transmitted on a subcarrier m1+1 on the ith antenna to 0, I(m1+1), 0; wherein the I(m1+1) is calculated according to a formula containing X(m1); and/or the I(m1−1) is calculated according to a formula containing X(m1).

18. The pilot signal transmission apparatus according to claim 17, wherein
the formula containing X(m1) used for calculating the I(m1+1) is:

$$I(m1+1)=X(m1)\langle g \rangle_{m1}^{m1+1},$$

or $$I(m1+1)=X(m1)\langle g \rangle_{m1}^{m1+1}+X(m1+2)\langle g \rangle_{m1+2}^{m1+1};$$

wherein $$\langle g \rangle_{m1}^{m1+1} = \int g_{m1}(t) g^*_{m1+1}(t)dt, \text{ and}$$

$$\langle g \rangle_{m1+2}^{m1+1} = \int g_{m1+2}(t) g^*_{m1+1}(t)dt,$$

wherein "*" is a conjugate operation, $g_{m1}$ is a filter function for the second symbol of the three pilot symbols on the subcarrier m1; $g_{m1+1}$ is a filter function for the second symbol of the three pilot symbols on the subcarrier m1+1; $g_{m1+2}$ is a filter function for the second symbol of the three pilot symbols on the subcarrier m1+2;

the formula containing X(m1) used for calculating the I(m1−1) is:

$$I(m1-1)=-X(m1)\langle g \rangle_{m1}^{m1-1},$$

or $$I(m1-1)=-X(m1)\langle g \rangle_{m1}^{m1-1}-X(m1+2)\langle g \rangle_{m1+2}^{m1-1},$$

wherein "*" is a conjugate operation, $g_{m1}$ is a prototype filter function for the second symbol of the three pilot symbols on the subcarrier m1; $g_{m1-1}$ is a prototype filter function for the second symbol of the three pilot symbols on the subcarrier m1−1; and $g_{m1+2}$ is a prototype filter function for the second symbol of the three pilot symbols on the subcarrier m1+2.

19. A non-transitory computer readable medium having stored thereon computer-executable instructions that, when executed by a processor, perform a method comprising:
setting a first pilot signal, a second pilot signal, and a third pilot signal on a same subcarrier; and
transmitting the first pilot signal, the second pilot signal, and the third pilot signal respectively on three consecutive symbols on the same subcarrier;
wherein:
the first pilot signal, the second pilot signal, and the third pilot signal are all nonzero data;
a phase difference between the first pilot signal and the second pilot signal is 90 degrees;
a phase difference between the third pilot signal and the second pilot signal is 90 degrees; and
a phase difference between the first pilot signal and the third pilot signal is 180 degrees.

* * * * *